United States Patent
Zhu et al.

(10) Patent No.: US 10,462,707 B2
(45) Date of Patent: Oct. 29, 2019

(54) DATA TRANSMISSION METHOD AND APPARATUS

(71) Applicant: TENCENT TECHNOLOGY (SHENZHEN) COMPANY LIMITED, Shenzhen (CN)

(72) Inventors: Liusong Zhu, Shenzhen (CN); Qing Song, Shenzhen (CN); Menglong Lei, Shenzhen (CN); Jianping Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 193 days.

(21) Appl. No.: 15/657,751

(22) Filed: Jul. 24, 2017

(65) Prior Publication Data
US 2017/0325129 A1    Nov. 9, 2017

Related U.S. Application Data (63) Continuation of application No. PCT/CN2016/079603, filed on Apr. 18, 2016.

(30) Foreign Application Priority Data

May 29, 2015   (CN) .......................... 2015 1 0287233

(51) Int. Cl.
*H04W 28/20*    (2009.01)
*H04L 12/24*    (2006.01)
(Continued)

(52) U.S. Cl.
CPC ......... *H04W 28/20* (2013.01); *H04L 41/0896* (2013.01); *H04L 43/0835* (2013.01);
(Continued)

(58) Field of Classification Search
CPC ............ H04L 41/0896; H04L 43/0835; H04L 43/0864; H04L 47/11; H04L 12/26;
(Continued)

(56) References Cited

U.S. PATENT DOCUMENTS 7,796,517 B2    9/2010    Truvideo
2008/0247419 A1*  10/2008  Elliot ..................... H04L 47/10
                                                              370/468

(Continued)

FOREIGN PATENT DOCUMENTS

CN    101958811 A    1/2011
CN    102045219 A    5/2011

OTHER PUBLICATIONS

The World Intellectual Property Organization (WIPO) International Search Report for PCT/CN2016/079603 Jul. 12, 2016.

*Primary Examiner* — Kyaw Z Soe
(74) *Attorney, Agent, or Firm* — Anova Law Group, PLLC (57) ABSTRACT

Embodiments of the present disclosure disclose a data transmission method and apparatus, and belong to the field of Internet technologies. The method includes: obtaining interaction information of a transmission link of a current moment; analyzing the interaction information, to obtain link status information corresponding to the interaction information; determining an available bandwidth for current data transmission according to the link status information that corresponds to the interaction information and link status information that corresponds to historical interaction information of the transmission link; and transmitting a data packet to a data receive end according to the available bandwidth. In the embodiments of the present disclosure, data transmission is performed based on the TCP Protocol, neither a data receive end nor a data transmit end needs to (Continued)

support an additional protocol, and applicability is relatively strong.

18 Claims, 6 Drawing Sheets

(51) Int. Cl.
    *H04L 12/26* (2006.01)
    *H04L 12/801* (2013.01)
    *H04L 12/841* (2013.01)

(52) U.S. Cl.
    CPC .......... *H04L 43/0864* (2013.01); *H04L 47/11* (2013.01); *H04L 47/193* (2013.01); *H04L 47/283* (2013.01); *H04L 41/0893* (2013.01); *H04L 43/0829* (2013.01)

(58) Field of Classification Search
    CPC .............. H04L 41/0893; H04L 43/0829; H04L 47/193; H04L 47/283; H04W 28/20
    See application file for complete search history.

(56) References Cited

U.S. PATENT DOCUMENTS

| | | | |
|---|---|---|---|
| 2009/0175191 A1* | 7/2009 | Lin | H04L 43/0829 370/253 |
| 2010/0020823 A1* | 1/2010 | Bai | H04L 47/2416 370/468 |
| 2011/0216648 A1* | 9/2011 | Mehrotra | H04L 47/30 370/230 |
| 2015/0109942 A1* | 4/2015 | Nguyen | H04L 43/0835 370/252 |
| 2015/0188830 A1* | 7/2015 | Zhao | H04L 47/27 370/235 |

* cited by examiner

DATA TRANSMISSION METHOD AND APPARATUS

CROSS-REFERENCES TO RELATED APPLICATION

This application is a continuation application of PCT Patent Application No. PCT/CN2016/079603, filed on Apr. 18, 2016, which claims priority to China Patent Application No. 201510287233.9, filed with the Chinese Patent Office on May 29, 2015 and entitled "DATA TRANSMISSION METHOD AND APPARATUS," the entire contents of both of which are incorporated herein by reference.

FIELD OF THE TECHNOLOGY

Embodiments of the present disclosure relate to the field of Internet technologies, and in particular, to a data transmission method and apparatus.

BACKGROUND OF THE DISCLOSURE

In recent years, with development of Internet technologies, mobile terminals become more popular. More users enrich their lives by browsing web pages, watching videos, participating in social activities, and the like on the mobile terminals. In a use scenario of the mobile terminals, to obtain a better experience effect, the users wish a shorter response time of data on mobile networks. The response time of the data on the mobile networks is mainly determined by a transmission manner of data on the mobile networks. Therefore, how to perform data transmission becomes an important problem in the Internet field.

Currently, when data transmission is performed in a related technology, the following manners are mainly used:

In a first manner, based on the SPDY (whose pronunciation is similar to speedy) Protocol, when a data obtaining request sent by a mobile terminal is received, corresponding data is obtained, and the data is transmitted to the mobile terminal by using technologies such as preference, multiplexing, compression, and active push.

In a second manner, based on the Zeta-Transmission Control Protocol (TCP), when a data obtaining request sent by a mobile terminal is received, corresponding data is obtained, a data transmission policy is determined by learning a network feature of a current transmission link, and data is further transmitted according to the determined data transmission policy.

In the process of implementing the embodiments of the present disclosure, the inventor finds that the related technology has at least the following problems:

In the first manner, both the mobile terminal and a server need to support the SPDY Protocol. It is very difficult to achieve seamless upgrading, and applicability is relatively poor. In addition, the SPDY Protocol is mainly applied to transmission of big data. In a transmission scenario of small data, and an acceleration effect is not ideal.

In the second manner, the data transmission policy is adjusted mainly by self-adaptive learning of the current network feature. In a transmission scenario of small data, the transmission link has been disconnected before the Zeta-TCP Protocol learns sufficient network features. Consequently, an acceleration effect is not ideal.

SUMMARY

To resolve the problems of the related technology, embodiments of the present disclosure provide a data transmission method and apparatus. The technical solutions are as follows:

According to a first aspect, a data transmission method is provided, the method including: obtaining interaction information of a transmission link of a current moment; analyzing the interaction information, to obtain link status information corresponding to the interaction information; determining an available bandwidth for current data transmission according to the link status information that corresponds to the interaction information and link status information that corresponds to historical interaction information of the transmission link; and transmitting a data packet to a data receive end according to the available bandwidth.

According to another aspect, a data transmission apparatus is provided, the apparatus including: an obtaining module, configured to obtain interaction information of a transmission link of a current moment; a first analysis module, configured to analyze the interaction information, to obtain link status information corresponding to the interaction information; a first determining module, configured to determine an available bandwidth for current data transmission according to the link status information that corresponds to the interaction information and link status information that corresponds to historical interaction information of the transmission link; and a first transmission module, configured to transmit a data packet to a data receive end according to the available bandwidth.

According to another aspect, a server is provided, the server including: one or more processors; and a memory, the memory storing one or more programs, the one or more programs being configured to be executed by the one or more processors, and the one or more programs including instructions used for performing the following operations: obtaining interaction information of a transmission link of a current moment; analyzing the interaction information, to obtain link status information corresponding to the interaction information; determining an available bandwidth for current data transmission according to the link status information that corresponds to the interaction information and link status information that corresponds to historical interaction information of the transmission link; and transmitting a data packet to a data receive end according to the available bandwidth.

By implementing the technical solutions provided in the embodiments of the present disclosure, an available bandwidth for current data transmission is determined according to link status information of interaction information and link status information of historical interaction information of a transmission link, and a data packet is further transmitted to a data receive end according to the available bandwidth. Because data transmission is performed based on the TCP Protocol, neither a data receive end nor a data transmit end needs to support an additional protocol, and applicability is relatively strong. Moreover, when an available bandwidth is determined, both interaction information and historical interaction information of a transmission link are considered, so that the determined bandwidth can better reflect a current network status, thereby obviously improving a data transmission rate.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary

DESCRIPTION OF EMBODIMENTS

To make objectives, technical solutions, and advantages of the present disclosure clearer, the following further describes implementation manners of the present disclosure in detail with reference to the accompanying drawings.

With development of Internet technologies, image sharing, as a scenario frequently used in the Internet era, has a very high user active degree in both a foreign image sharing website and a domestic image sharing social application. In a process of viewing images shared by another user, if a user wants to add some images to favorites, the user needs to download these images from a server by using a mobile terminal. A problem of data transmission on a transmission link is involved in this process. Because image data is relatively small, correspondingly, a transmission scenario of the image data is always relatively simple. At present, one to three images within several hundred KB may be simultaneously transmitted on each transmission link. However, a mobile network is more complex than a wired network, and the image data is affected by various factors in the transmission process. Consequently, the transmission rate is relatively low, and a downloading time of the image data is relatively long.

Currently, there are mainly two reasons for a relatively long time consumed when a mobile terminal downloads image data. One reason is that a round-trip time (RTT) of a current network is relatively large. Round-trip time (RTT), as used herein, may also be referred as round-trip delay time (RTD), which indicates the length of time it takes for a signal to be sent plus the length of time it takes for an acknowledgment of that signal to be received. The other is that a TCP protocol stack deployed on a server end actively decreases a data transmission amount after detecting network congestion. The RTT of the current network mainly depends on factors such as a transmission medium, a transmission distance, and processing logic of each node on a transmission path. These factors belong to basic property of a network, and are therefore not described in this embodiment.

For the problem of low transmission rate caused by the TCP protocol stack, a conventional TCP protocol stack controls a data transmission rate mainly by using a sliding window. The sliding window is mainly limited by a receive window and a congestion control window of a data receive end. The receive window of the data receive end is determined by a data receiving capability of the data receive end, and the congestion control window is mainly determined by a congestion control algorithm of the TCP protocol stack. Currently, there are many congestion control algorithms of the TCP protocol stack. These congestion control algorithms probe a network congestion status mainly based on packet loss or time fluctuation. An effect of controlling the data transmission process by the TCP protocol stack is more obvious in a persistent connection transmission scenario of a wired network, while an effect of controlling the data transmission process by the TCP protocol stack in a short connection scenario of a mobile network is not obvious. The TCP protocol stack may perform determining incorrectly due to a high packet loss rate and an unstable RTT of the mobile network. In a normal mobile network environment, the TCP protocol stack actively reduces a data packet sending amount. This causes a low data transmission rate in the mobile network, and a relatively long image downloading time on the mobile terminal.

Figure 1:
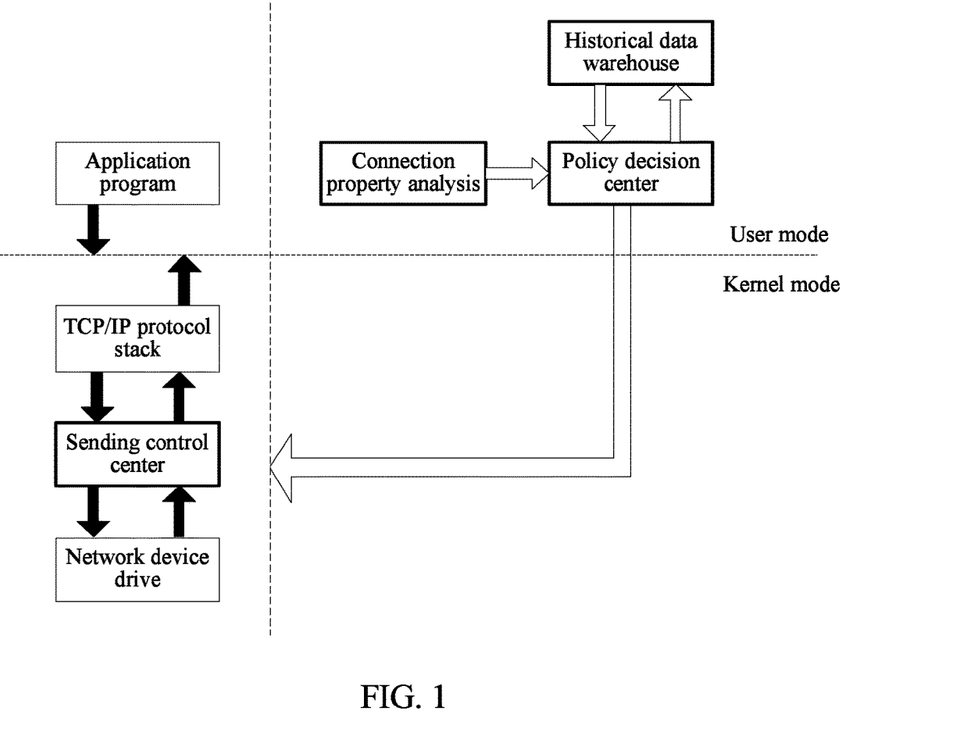
FIG. 1 is a system architecture diagram of a TCPA according to an embodiment of the present disclosure.

To improve the data transmission rate, an embodiment of the present disclosure provides a data transmission method. The method is based on a system architecture diagram of a Tencent TCP accelerator (TCPA) shown in FIG. 1. As shown in FIG. 1, the TCPA system includes two parts. One part is deployed in a kernel mode, mainly including a sending control center. This part is mainly responsible for specific data transmission. The other part is deployed in a user mode, mainly including a connection property analysis module, a policy decision center, and a historical data warehouse. This part mainly decides a data sending policy. A decision result obtained through decision by this part may be delivered to the sending control center in the kernel mode by using the policy decision center. The sending control center controls a data transmission process according to the decision result. It should be noted that black arrows in the figure represent directions of application data flows. White arrows in the figure represent directions of decision data flows.

Figure 2:
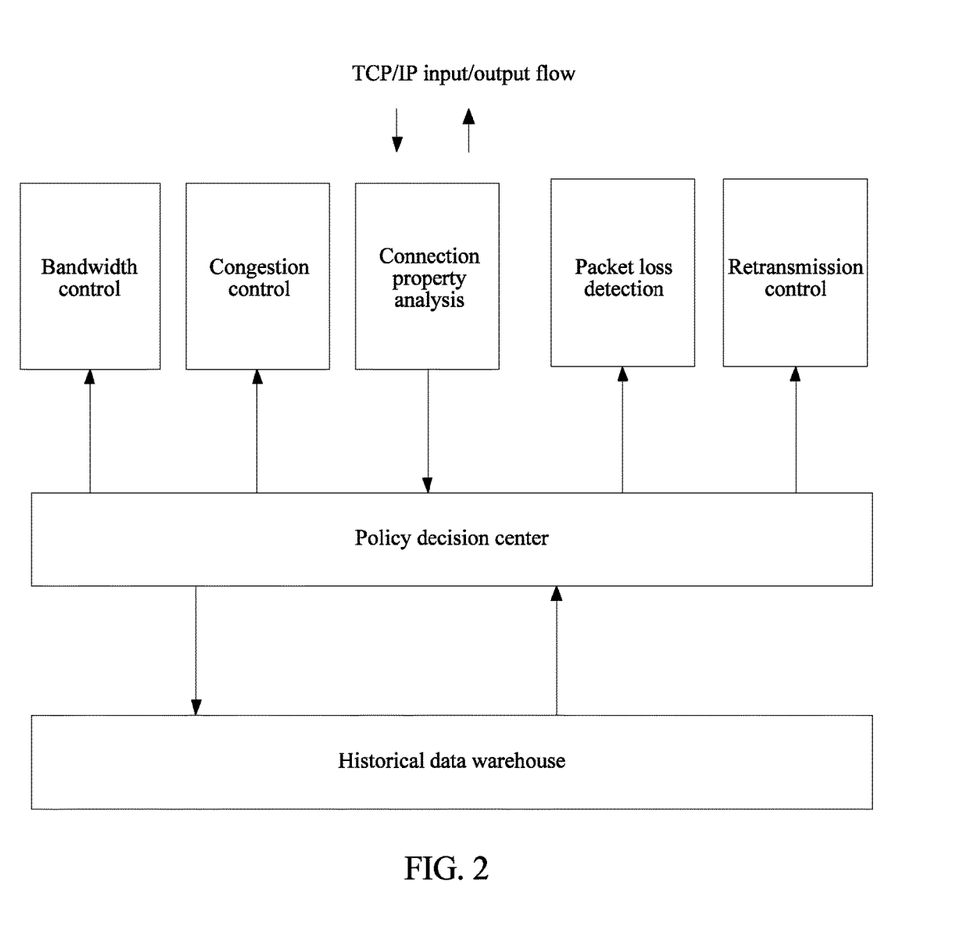
FIG. 2 is a logical architecture diagram of a TCPA according to another embodiment of the present disclosure.

Based on the system architecture diagram in FIG. 1, FIG. 2 is a logical architecture diagram of the TCPA. After a server establishes a connection to a mobile terminal, the server monitors interaction information of interaction with the mobile terminal, analyzes interaction information of each transmission link by invoking a link property analysis module, and further sends an analysis result to a policy decision center, so that the policy decision center makes a decision according to the analysis result and historical interaction information that is obtained from a historical data warehouse, and determines a data transmission policy according to the decision result. The data transmission policy directly affects bandwidth control, congestion control, packet loss detection, and retransmission control by the server. When the server performs data transmission by using the data transmission policy, a data transmission rate can be increased and a data downloading time can be reduced.

Figure 3:
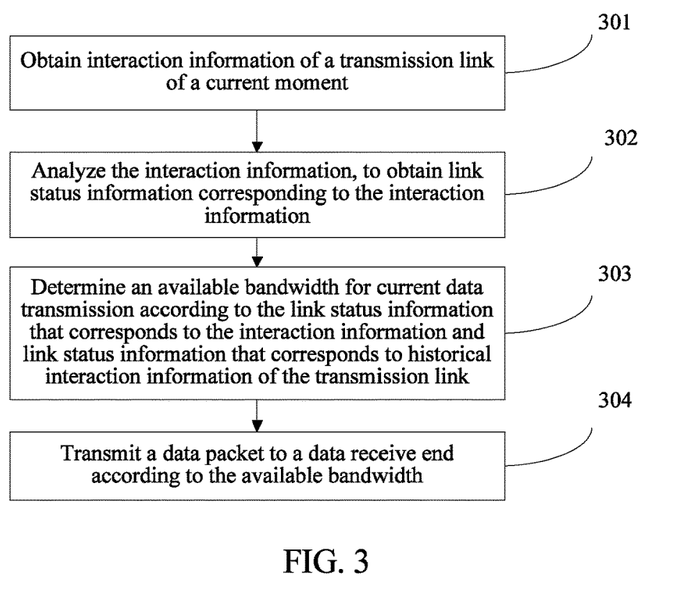
FIG. 3 is a flowchart of a data transmission method according to another embodiment of the present disclosure.

An embodiment of the present disclosure provides a data transmission method. Referring to FIG. 3, a procedure of the method provided in this embodiment includes the following steps.

301: Obtaining interaction information of a transmission link of a current moment.

302: Analyzing the interaction information, to obtain link status information corresponding to the interaction information.

303: Determining an available bandwidth for current data transmission according to the link status information that corresponds to the interaction information and link status information that corresponds to historical interaction information of the transmission link.

304: Transmitting a data packet to a data receive end according to the available bandwidth.

According to the method provided in this embodiment of the present disclosure, an available bandwidth for current data transmission is determined according to link status information of interaction information and link status information of historical interaction information of a transmission link, and a data packet is further transmitted to a data receive end according to the available bandwidth. Because data transmission is performed based on the TCP Protocol, neither a data receive end nor a data transmit end needs to support an additional protocol, and applicability is relatively strong. Moreover, when an available bandwidth is determined, both interaction information and historical interaction information of a transmission link are considered, so that the determined bandwidth can better reflect a current network status, thereby obviously improving a data transmission rate.

In another embodiment of the present disclosure, the link status information includes a round-trip time RTT; and the determining an available bandwidth for current data transmission according to the link status information that corresponds to the interaction information and link status information that corresponds to historical interaction information of the transmission link includes: determining, from an RTT of the interaction information and an RTT of the historical interaction information, a target RTT satisfying a preset short-delay condition; and determining the available bandwidth for current data transmission according to the target RTT and a data transmission amount that corresponds to the target RTT.

In another embodiment of the present disclosure, the link status information includes delay information, where the delay information includes a round-trip time RTT and an RTT volatility rate; and the determining an available bandwidth for current data transmission according to the link status information that corresponds to the interaction information and link status information that corresponds to historical interaction information of the transmission link includes: selecting a target RTT from an RTT of the interaction information and an RTT of the historical interaction information according to an RTT volatility rate of the interaction information and an RTT volatility rate of the historical interaction information; and determining the available bandwidth for current data transmission according to the target RTT and a data transmission amount that corresponds to the target RTT.

In another embodiment of the present disclosure, the transmitting a data packet to a data receive end according to the available bandwidth includes: analyzing the interaction information, to obtain packet loss information corresponding to the interaction information; determining current network congestion status information according to the packet loss information that corresponds to the interaction information and packet loss information that corresponds to the historical interaction information; adjusting the determined available bandwidth according to the current network congestion status information; and transmitting the data packet to the data receive end according to the adjusted available bandwidth.

In another embodiment of the present disclosure, after the transmitting a data packet to a data receive end according to the available bandwidth, the method further includes: analyzing the interaction information, to obtain packet loss information corresponding to the interaction information; determining current network congestion status information according to the packet loss information that corresponds to the interaction information and packet loss information that corresponds to the historical interaction information; adjusting the available bandwidth according to the current network congestion status information; and performing transmission according to the adjusted available bandwidth when the data packet is transmitted to the data receive end next time.

In another embodiment of the present disclosure, after the transmitting a data packet to a data receive end according to the available bandwidth, the method further includes: sending a packet loss probe message to the data receive end when it is detected that duration during which no data packet is transmitted reaches preset duration and a data packet for which no response message is returned exists in transmitted data packets, where the packet loss probe message carries last byte information of the last transmitted data packet; determining a lost data packet from the transmitted data packets according to a response message corresponding to the packet loss probe message, when the response message is received, where the response message carries last byte information of the last data packet received by the data receive end and the last byte information of the last transmitted data packet; and retransmitting the lost data packet.

In another embodiment of the present disclosure, after the transmitting a data packet to a data receive end according to the available bandwidth, the method further includes: determining first weighted packet loss information according to packet loss information of the interaction information and packet loss information of the historical interaction information of the transmission link; determining, according to a prestored correspondence between weighted packet loss information and retransmission duration, first retransmission duration corresponding to the first weighted packet loss information; and retransmitting the data packet when the first retransmission duration is reached.

In another embodiment of the present disclosure, the transmitting a data packet to a data receive end according to the available bandwidth includes: determining a first weighted available bandwidth according to the available bandwidth and a parallel historical available bandwidth; and transmitting the data packet to the data receive end based on a preset first data packet parallel transmission quantity, if the weighted available bandwidth is greater than a preset bandwidth threshold; or transmitting the data packet to the data receive end based on a preset second data packet parallel transmission quantity, if the weighted available bandwidth is less than or equal to the preset bandwidth threshold, where the first data packet parallel transmission quantity is greater than the second data packet parallel transmission quantity.

Any combination of the foregoing optional technical solutions may be used to form an optional embodiment of the present disclosure, and details are not described herein.

Figure 4:
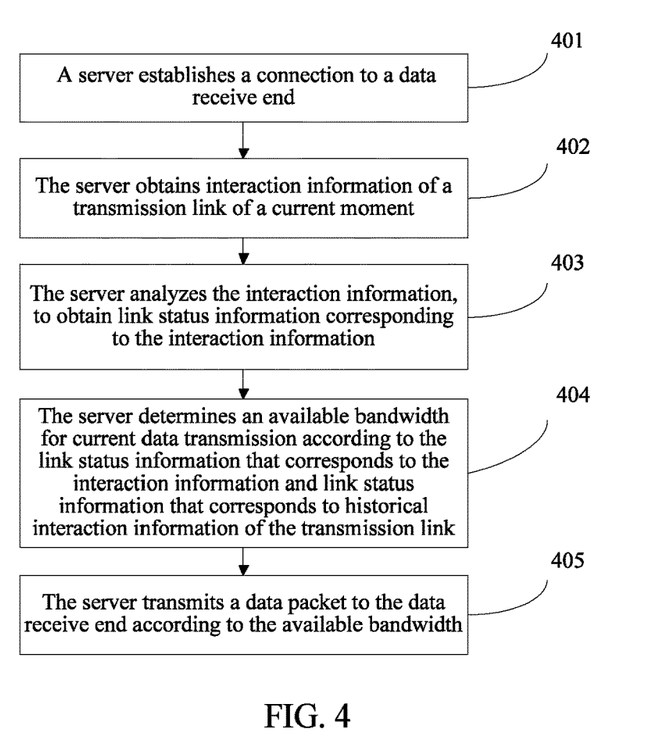
FIG. 4 is a flowchart of a data transmission method according to another embodiment of the present disclosure.

An embodiment of the present disclosure provides a data transmission method. The method is applicable to a scenario in which a mobile terminal downloads image data by using a mobile network. In the scenario, a current network is the mobile network. Referring to FIG. 4, a procedure of the method provided in this embodiment includes the following steps.

401: A server establishes a connection with a data receive end.

The data receive end is a mobile terminal, such as a smartphone or a tablet computer, that downloads image data from, for example, an image sharing service. In the field of Internet technologies, to perform data transmission, the server and the data receive end usually perform a three-way handshake before data transmission.

The first handshake between the data receive end and the server is as follows: The data receive end sends a synchronize sequence number (SYN) packet to the server, enters a SYN SENT state, and waits for an acknowledgement by the server.

The second handshake between the data receive end and the server is as follows: After receiving the SYN packet sent by the data receive end, the server acknowledges the received SYN packet by sending an acknowledgement (ACK) packet to the data receive end. Meanwhile, the server also sends a SYN packet to the data receive end. The server enters a SYN_RECV state.

The third handshake between the data receive end and the server is as follows: The data receive end returns an ACK packet to the server after receiving the SYN-ACK packet sent by the server. Afterwards, the data receive end and the server enter a connected state.

After the foregoing three-way handshake is completed, a connection may be established between the server and the data receive end.

402: The server obtains interaction information of a transmission link of a current moment.

Based on the established connection, the server may monitor each data interaction process on the transmission link, until the established connection is disconnected. In the process, when detecting that there is interaction information on the transmission link of the current moment, the server obtains the interaction information. The interaction information includes data such as a data packet number, a flag (a parameter used for recording a variable), a time stamp, magnitude of TCP load. Content of the interaction information is not specifically limited in this embodiment.

403: The server analyzes the interaction information, to obtain link status information corresponding to the interaction information.

After obtaining the interaction information, the server invokes a link feature analysis module (e.g., the connection property analysis module as shown in FIG. 2) to analyze the obtained interaction information. The link status information of the interaction information of the transmission link may be obtained through analysis. In this embodiment, the link status information may include delay information. The delay information includes at least an RTT, an RTT volatility rate, and the like of a current link. In addition, the server may further determine, according to the interaction information, other information such as packet loss information and retransmission information. The packet loss information includes at least a packet loss rate, a packet loss location, and the like. The retransmission information includes at least a retransmission delay, a retransmission size, a repeated ACK packet, and the like.

The server may determine the delay information corresponding to the interaction information in the following processing manner:

When the server intends to transmit data to the data receive end, the server usually adds a piece of time stamp information to a to-be-transmitted data packet. After receiving the data packet sent by the server, the data receive end returns a response message to the server, where the response message carries a piece of time stamp information. After receiving the response message returned by the data receive end, the server may calculate, based on the time stamp information carried in the sent data packet and the time stamp information in the response message, a time difference from when the data packet is sent to when the data packet is received. The time difference is an RTT. Because the mobile network is unstable, when a same data packet is transmitted on a same link, an RTT calculated each time may be different. The server may obtain an RTT volatility rate by analyzing RTTs in multiple transmission processes.

In addition, this embodiment further provides a processing manner of determining, by the server, the packet loss information and the retransmission information that correspond to the interaction information. Specific content may be as follows:

(1) Packet Loss Information

To help manage to-be-transmitted data, when the server intends to transmit data to the data receive end, the server usually numbers to-be-sent data packets, and further transmits the to-be-sent the data packets in ascending order of the numbers during subsequent data transmission. If the data receive end receives the data sent by the server, the data receive end returns a response message to the server. The response message is used for notifying the server of a determined data packet number in the sent data packets. The server may determine a lost data packet and a location of the lost data packet in the sent data packets in the transmission process according to the numbers of the sent data packets and the determined data packet number. The location is the packet loss location.

(2) Retransmission Information

To ensure completeness of data received by the receive end, after detecting that a data packet is lost in the transmission process, the server retransmits the lost data packet to the data receive end. The server may determine a retransmission size according to a quantity of retransmitted data packets. The server may determine a retransmission delay according to time stamp information that is carried in the initially transmitted data packet and time stamp information that is carried in the retransmitted data packet. In addition, in this process, if a data packet is lost, a data packet before the data packet and a data packet after the data packet each send an ACK packet to the server. The server may determine repeated ACK packets based on the received ACK packets.

In addition, after invoking the link analysis module to analyze the interaction information of the transmission link of the current moment, the server further writes the obtained interaction information back to a historical data warehouse by using an IP address as a reference, so as to provide data support for subsequent data transmission.

404: The server determines an available bandwidth for current data transmission according to the link status information that corresponds to the interaction information and link status information that corresponds to historical interaction information of the transmission link.

A conventional TCP protocol stack mainly controls an available bandwidth of a data transmit end by using a sliding window mechanism. A sliding window is mainly limited by a congestion window and a receive window of the data receive end. Moreover, at the beginning of the establishment of the connection between the server and the data receive end, the TCP protocol stack cannot detect a congestion status of a current network. In this case, the sliding window is mainly limited by an initial window set by the server and the receive window of the data receive end. In addition, a network environment of a mobile network is much more complex than a network environment of a wired network, and network environments of different data receive ends vary greatly. Therefore, the set initial window is not applicable in different network environments. In this case, a current network status cannot be accurately reflected according to the sliding window determined by using the initial window and the receive window of the data receive end, and further, the determined available bandwidth is not accurate.

To improve the accuracy of the determined available bandwidth, after analyzing the interaction information of the current transmission link to obtain the link status information of the interaction information, the server further obtains the historical interaction information of the transmission link of the current moment from the historical data warehouse, and further analyzes the historical interaction information in a same manner as that for the currently obtained interaction information, to obtain the link status information of the historical interaction information of the transmission link. Then, the server invokes a data link analysis module to perform offline analysis on the link status information of the interaction information and the link status information of the historical interaction information of the transmission link, so that the available bandwidth for current data transmission may be obtained.

Optionally, the link status information includes a round-trip time RTT. The server may determine the available bandwidth for current data transmission according to the RTT. A corresponding processing process may be as follows: determining, from an RTT of the interaction information and an RTT of the historical interaction information, a target RTT satisfying a preset short-delay condition; and determining the available bandwidth for current data transmission according to the target RTT and a data transmission amount that corresponds to the target RTT.

During implementation, the server may analyze the interaction information to obtain the RTT corresponding to the interaction information. The server may further obtain the RTT of the historical interaction information. The historical interaction information may be interaction information within a historical time period corresponding to the current time. For example, if a time period corresponding to interaction information currently obtained by the server is April 1, 12:30:15-17, the historical interaction information may be interaction information obtained within March 1, 12:30:15-17. The server may obtain the RTT of the current interaction information and the RTT of the historical interaction information, and then may determine the target RTT satisfying the preset short-delay condition. For example, the server may determine a smallest target RTT from obtained RTTs, or may determine a target RTT less than a preset delay threshold. The server may determine a data transmission amount corresponding to the target RTT. The data transmission amount corresponding to the target RTT may be an actual data amount transmitted within a historical time period corresponding to the target RTT. The server may obtain the available bandwidth for current data transmission by multiplying the target RTT by the data transmission amount corresponding to the target RTT.

For ease of understanding, a specific example is used for describing the foregoing process.

For example, the server monitors the transmission link of the current moment, obtains that the RTT of the interaction information is 20 milliseconds (ms), and obtains, from the historical data warehouse, that RTTs of historical interaction information of the transmission link in the last three days are 18 ms, 16 ms, and 21 ms. As may be learned by analyzing the RTTs of the interaction information and the historical interaction information, the RTTs of the transmission link are fluctuating. To avoid loss of a data packet in the transmission process, and make data received by the data receive end complete, the server may select a smallest RTT as the target RTT according to RTT volatility rates of the interaction information and the historical interaction information, and then multiply the RTT by a data transmission amount corresponding to the RTT to obtain a bandwidth. The bandwidth is the available bandwidth for current data transmission.

Optionally, the link status information may further include delay information, where the delay information may include a round-trip time RTT and an RTT volatility rate. The server may determine the available bandwidth according to the round-trip time RTT and the RTT volatility rate. A corresponding processing process may be as follows: determining, from the RTT of the interaction information and the RTT of the historical interaction information, the target RTT satisfying the preset short-delay condition; and determining the available bandwidth for current data transmission according to the target RTT and the data transmission amount that corresponds to the target RTT.

In this step, the server mainly determines the available bandwidth for current data transmission according to the delay information in the link status information. During specific determining, the server may determine an average value of RTTs according to the obtained RTTs, then determine, from RTTs less than the average value, a target RTT having a largest RTT volatility rate, and then determine the available bandwidth for current data transmission according to the target RTT and the data transmission amount that corresponds to the target RTT.

405: The server transmits a data packet to the data receive end according to the available bandwidth.

Based on the determined available bandwidth, the server may transmit a data packet to the data receive end according to the determined available bandwidth. If the network environment is relatively good, when the server transmits the data packet by using the determined available bandwidth, the server may directly transmit a small image of 10 KB to the data receive end in a one-off manner, thereby avoiding being limited by the sliding window of the TCP protocol stack, and improving a data transmission rate.

Figure 5:
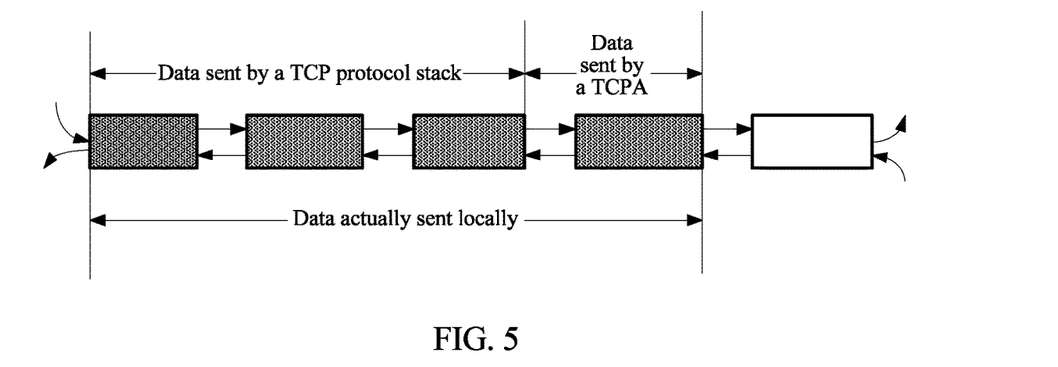
FIG. 5 is a schematic diagram of a process for controlling a bandwidth in a data transmission process according to another embodiment of the present disclosure.

To intuitively show superiority of the method provided in this embodiment when the method is used in data transmission, FIG. 5 is used as an example for description.

Referring to FIG. 5, when a network status is relatively good, if data transmission is performed by using an original available bandwidth of a TCP protocol stack, only three data packets can be transmitted in one data transmission process. However, when data transmission is performed by using an available bandwidth determined in this embodiment, four data packets can be sent in one transmission process. Because a quantity of data packets sent at a time increases, a data transmission rate is improved.

In this way, data sending is implemented in the foregoing process. Based on this, the method provided in this embodiment further supports adjusting the determined available bandwidth, performing packet loss detection on the sent data packets, retransmitting a lost data packet, and the like. For details, refer to the following content.

Optionally, the available bandwidth may be first adjusted according to packet loss information, and then a data packet is transmitted. Correspondingly, a processing process of step 405 may be as follows: analyzing interaction information to obtain packet loss information corresponding to the interaction information; determining congestion status information of a current network according to the packet loss information that corresponds to the interaction information and packet loss information that corresponds to historical interaction information; adjusting the determined available bandwidth according to the congestion status information; and transmitting a data packet to a data receive end according to the adjusted available bandwidth.

Figure 6:
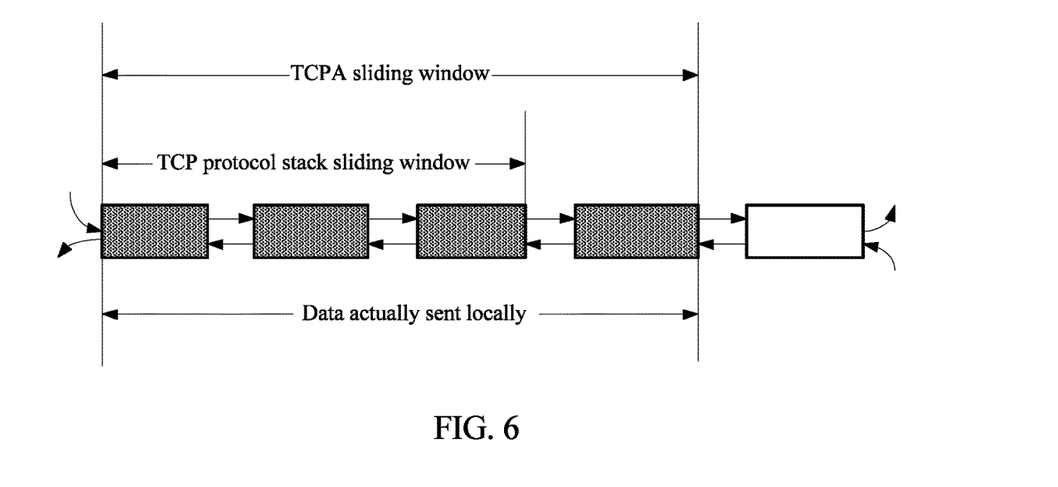
FIG. 6 is a schematic diagram of a process for controlling congestion in a data transmission process according to another embodiment of the present disclosure.

During implementation, the server may analyze the interaction information to obtain the packet loss information corresponding to the interaction information. The packet loss information includes at least a packet loss rate, a packet loss location, and the like. The specific processing manner is described above, and details are not described herein again. The server may determine a weighted average value of packet loss rates according to a packet loss rate that corresponds to the interaction information and a packet loss rate that corresponds to the historical interaction information, and then may determine the congestion status information of the current network according to the calculated weighted average value. For example, if the weighted average value is greater than a packet loss rate threshold, it may be determined that the congestion status information of the current network is congestion. If the weighted average value is not greater than the packet loss rate threshold, it may be determined that the congestion status information of the current network is noncongestion. If determining that the congestion status information of the current network is congestion, the server may reduce the determined available bandwidth. If determining that the congestion status information of the current network is noncongestion, the server may transmit the data packet according to the determined available bandwidth, or increase the determined available bandwidth. In this way, the sliding window may be independently maintained based on a TCPA. When a data packet is sent, if data sent by a TCP protocol stack cannot fill the sliding window of the TCPA, the TCPA takes subsequent data from a transmit queue for further sending, as shown in FIG. 6.

Optionally, traffic control may be performed according to the determined available bandwidth. Correspondingly, a processing process of step 405 may be as follows: determining a first weighted available bandwidth according to the available bandwidth and a parallel historical available bandwidth; and if the weighted available bandwidth is greater than a preset bandwidth threshold, transmitting a data packet to the data receive end based on a preset first data packet parallel transmission quantity; or if the weighted available bandwidth is less than or equal to a preset bandwidth threshold, transmitting a data packet to the data receive end based on a preset second data packet parallel transmission quantity, where the first data packet parallel transmission quantity is greater than the second data packet parallel transmission quantity.

During implementation, after determining the available bandwidth of the current network, the server may obtain the parallel historical available bandwidth. The parallel historical bandwidth may be an available bandwidth within a historical time period corresponding to the current time. For example, if the server determines that the available bandwidth in April 1, 12:30:15-17 is A, the parallel historical available bandwidth may be an available bandwidth in March 1, 12:30:15-17. The server may calculate the first weighted available bandwidth by multiplying the available bandwidth by a weighted value corresponding to the available bandwidth, and adding the result to a result that is obtained by multiplying the parallel historical available bandwidth by a weighted value corresponding to the parallel historical available bandwidth. The server may determine whether the first weighted available bandwidth is greater than the preset bandwidth threshold. If the server determines that the weighted available bandwidth is greater than the preset bandwidth threshold, the server may transmit the data packet to the data receive end based on the preset first data packet parallel transmission quantity. If the weighted available bandwidth is less than or equal to the preset bandwidth threshold, the server may transmit the data packet to the data receive end based on the preset second data packet parallel transmission quantity. The first data packet parallel transmission quantity is greater than the second data packet parallel transmission quantity, and first data packet data may be a preset sending quantity of the TCP protocol stack. For example, when the data packet is initially sent, if the server determines that the weighted available bandwidth is greater than the preset bandwidth threshold, three data packets may be transmitted in parallel. If the server determines that the weighted available bandwidth is not greater than the preset bandwidth threshold, four data packets may be sent in parallel, as shown in FIG. 5.

In addition, the server may determine a second weighted available bandwidth according to the available bandwidth and the parallel historical available bandwidth, then may determine, according to a prestored correspondence between a weighted available bandwidth and a data packet quantity, a first data packet quantity corresponding to the first weighted available bandwidth, and transmit data packets of the first data packet quantity to the data receive end.

Optionally, the available bandwidth may be adjusted for a subsequent/future data packet transmission. A corresponding processing process may be as follows: analyzing the interaction information to obtain packet loss information corresponding to the interaction information; determining congestion status information of a current network according to the packet loss information that corresponds to the interaction information and packet loss information that corresponds to the historical interaction information; adjusting the available bandwidth according to the congestion status information; and performing transmission according to the adjusted available bandwidth next time when a data packet is transmitted to the data receive end.

A quantity of store-and-forward nodes in a network is limited. Therefore, when there are many transmitted data packets in the network, a network capacity decreases. If a traditional data transmission method is used, after the server determines congestion of the current network according to the TCP protocol stack by using a congestion control algorithm such as cubic or bic, the server actively reduces the available bandwidth, to relieve a congestion degree of the current network. However, in an actual application, repeated ACKs caused by disorder and a packet loss caused by network signal reduction or switching cannot be used as a feature of network congestion. After performing analysis by using a traditional TCP protocol stack, the server determines that the network is currently congested, and may reduce the available bandwidth, and consequently, the transmission rate is relatively low. To avoid meaningless reduction of the transmission bandwidth, in this embodiment, the server further analyzes a congestion status of the current network according to the packet loss information in the link status information, to readjust the transmission bandwidth according to an analysis result. During specific implementation of the process, the server may determine factors such as a historical packet loss status of the transmission link in a same time period, a current packet loss location, and a packet loss rate according to the packet loss information of the interaction information and the packet loss information of the historical interaction information, determine the congestion status of the current network according to these factors, and further adjust the available bandwidth according to the determined congestion status, so as to perform transmission according to the adjusted available bandwidth next time when a subsequent data packet is to-be-transmitted to the data receive end. A specific adjustment manner is the same as the foregoing adjustment manner. Details are not described herein again.

To intuitively show superiority of the method provided in this embodiment when the method is used in data transmission, FIG. 6 is used as an example for description.

Referring to FIG. 6, when a network status is relatively good, a sliding window determined by using a traditional method can only transmit three data packets at a time, while a sliding window adjusted according to the method provided in this embodiment of the present disclosure can send four data packets at a time. Because a quantity of data packets sent at a time increases, a data transmission rate is improved.

In the Internet field, to ensure completeness of data received by a data receive end, after transmitting a data packet to the data receive end, a server further performs packet loss detection on the transmitted data packet. The packet loss detection is mainly used for detecting a tail drop of a transmitted data packet, so as to perform retransmission in a timely manner after it is found that a tail data packet is lost, thereby reducing a data downloading time, and improving user experience.

Figure 7:
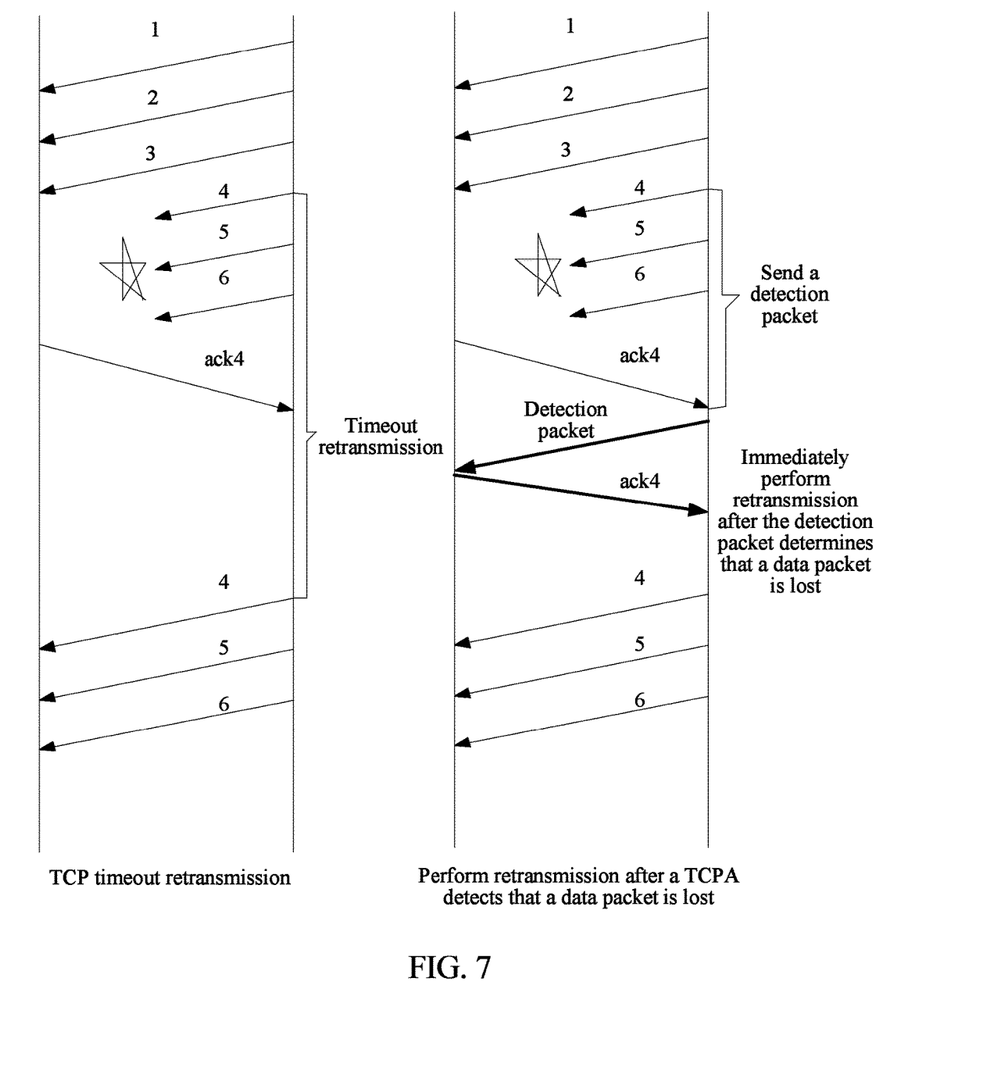
FIG. 7 is a schematic diagram of a process for performing packet loss probe in a data transmission process according to another embodiment of the present disclosure.

Referring to left side in FIG. 7, after a server transmits six data packets, that is, data packets 1, 2, 3, 4, 5, and 6, to a data receive end, after it is detected, by using a traditional packet loss detection method, that the data packets 4, 5, and 6 are lost, a retransmission mechanism is started after a recovery time object (RTO) time, to retransmit the lost data packets. The process takes a relatively long time. In a scenario of image downloading by a mobile terminal, images each within 10 KB account for a large proportion. On a same transmission link, images are simultaneously downloaded. Therefore, a probability that a tail packet loss occurs greatly increases. If the method in the left side in FIG. 7 is used for packet loss detection, a user may wait for several seconds when downloading an image within 10 KB. The user experience is relatively poor.

To improve a data transmission rate and user experience, in the method provided in this embodiment, after data is transmitted to the data receive end according to an available bandwidth, it is further detected whether duration during which no data packet is transmitted on the transmission link reaches preset duration. When it is detected that the duration during which no data packet is transmitted reaches the preset duration and a data packet for which no response message is returned exists in transmitted data packets, a packet loss probe message is sent to the data receive end. The packet loss probe message carries last byte information of the last transmitted data packet. When a response message corresponding to the packet loss probe message is received, where the response message carries the last byte information of the last data packet received by the data receive end and the last byte information of the last transmitted data packet, a lost data packet is determined from the transmitted data packets according to the response message. The lost data packet is retransmitted.

During implementation, when it is detected that the duration during which no data packet is transmitted reaches the preset duration and the data packet for which no response message is returned exists in the transmitted data packets, the server may send the packet loss probe message to the data receive end, where the packet loss probe message may carry the last byte information of the last transmitted data packet. After receiving the packet loss probe message, the data receive end may compare the received last byte information of the last data packet with the last byte information in the packet loss probe message. If the two are different, the data receive end may determine that a data packet is lost, then may generate a response message, where the response message is used for indicating a receiving status of a currently transmitted data packet on the data receive end, and the response message may carry the last byte information of the last data packet received by the data receive end and the last byte information of the last transmitted data packet, and send the response message to the server. After receiving the response message, the server may determine the lost data packet from the transmitted data packets according to the response message, and further transmit the lost data packet to the data receive end in a timely manner. The preset duration may be 3 ms, 5 ms, 7 ms, or the like. The preset duration is not specifically limited in this embodiment.

Referring to the right side in FIG. 7, after transmitting six data packets, that is, data packets 1, 2, 3, 4, 5, and 6, to the data receive end, when the server detects that the duration during which no data packet is transmitted reaches the preset duration and does not receive ACK packets returned by the data packets 4, 5, and 6, the server sends a packet loss probe message to the data receive end. After receiving the packet loss probe message, the data receive end returns a response message to the server, where the response message is used for notifying the server that the data packets 4, 5, and 6 are lost. After receiving the response message, the server retransmits the data packets 4, 5, and 6 to the data receive end.

The foregoing process is a process in which the server retransmits a lost data packet to the data receive end after the server proactively detects that the data packet is lost. Certainly, to improve a data transmission rate and reduce a waiting time, the server may further invoke a policy decision center to analyze packet loss information of interaction information and packet loss information of historical interaction information of the transmission link, determine first weighted packet loss information according to the packet loss information of the interaction information and the packet loss information of the historical interaction information of the transmission link, determine first retransmission duration corresponding to the first weighted packet loss information according to a prestored correspondence between weighted packet loss information and retransmission duration, and retransmit the data packet when the first retransmission duration is reached.

During implementation, the server may determine the first weighted packet loss information according to the packet loss information of the interaction information and the packet loss information of the historical interaction information of the transmission link, and determine the first retransmission duration corresponding to the first weighted packet loss information according to the prestored correspondence between the weighted packet loss information and the retransmission duration. In the correspondence, larger weighted packet loss information may correspond to smaller retransmission duration, and smaller weighted packet loss information may correspond to larger retransmission duration. After determining the first retransmission duration corresponding to the first weighted packet loss information, the server may retransmit the data packet when the first retransmission duration is reached. In addition, the server may obtain, through analysis, a location of frequent packet loss in the data packet, and locations and a quantity of repeated ACKs, determine a retransmission occasion and a to-be-retransmitted data packet according to the location of frequent packet loss in the data packet, and the locations and the quantity of repeated ACKs, and further retransmit the to-be-retransmitted data packet to the data receive end when the retransmission occasion arrives.

According to the method provided in this embodiment of the present disclosure, an available bandwidth for current data transmission is determined according to link status information of interaction information and link status information of historical interaction information of a transmission link, and a data packet is further transmitted to a data receive end according to the available bandwidth. Because data transmission is performed based on the TCP Protocol, neither a data receive end nor a data transmit end needs to support an additional protocol, and applicability is relatively strong. Moreover, when an available bandwidth is determined, both interaction information and historical interaction information of a transmission link are considered, so that the determined bandwidth can better reflect a current network status, thereby obviously improving a data transmission rate.

Figure 8:
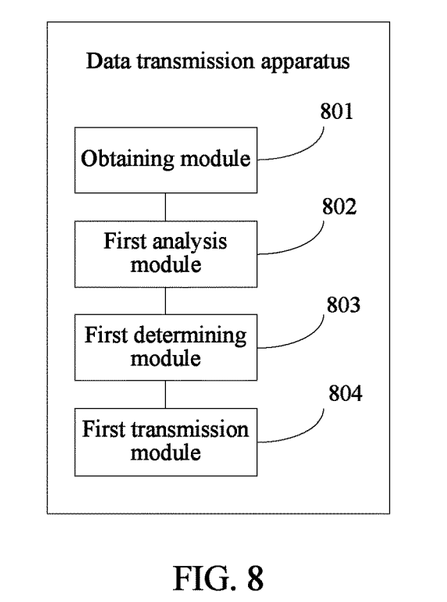
FIG. 8 is a schematic structural diagram of a data transmission apparatus according to another embodiment of the present disclosure.

Referring to FIG. 8, an embodiment of the present disclosure provides a data transmission apparatus. The apparatus includes: an obtaining module 801, configured to obtain interaction information of a transmission link of a current moment; a first analysis module 802, configured to analyze the interaction information, to obtain link status information of the interaction information; a first determining module 803, configured to determine an available bandwidth for current data transmission according to the link status information of the interaction information and link status information of historical interaction information of the transmission link; and a first transmission module 804, configured to transmit a data packet to a data receive end according to the available bandwidth.

In another embodiment of the present disclosure, the link status information includes a round-trip time RTT; and the first determining module 803 is configured to: determine, from an RTT of the interaction information and an RTT of the historical interaction information, a target RTT satisfying a preset short-delay condition; and determine the available bandwidth for current data transmission according to the target RTT and a data transmission amount that corresponds to the target RTT.

In another embodiment of the present disclosure, the link status information includes delay information, where the delay information includes a round-trip time RTT and an RTT volatility rate; and the first determining module 803 is configured to: select a target RTT from an RTT of the interaction information and an RTT of the historical interaction information according to an RTT volatility rate of the interaction information and an RTT volatility rate of the historical interaction information; and determine the available bandwidth for current data transmission according to the target RTT and a data transmission amount that corresponds to the target RTT.

In another embodiment of the present disclosure, the first transmission module 804 is configured to: analyze the interaction information, to obtain packet loss information corresponding to the interaction information; determine congestion status information of a current network according to the packet loss information that corresponds to the interaction information and packet loss information that corresponds to the historical interaction information; adjust the determined available bandwidth according to the congestion status information; and transmit the data packet to the data receive end according to the adjusted available bandwidth.

In another embodiment of the present disclosure, the apparatus further includes: a second analysis module, configured to analyze the interaction information, to obtain packet loss information corresponding to the interaction information; a second determining module, configured to determine congestion status information of a current network according to the packet loss information that corresponds to the interaction information and packet loss information that corresponds to the historical interaction information; an adjustment module, configured to adjust the available bandwidth according to the congestion status information; and a second transmission module, configured to perform transmission according to the adjusted available bandwidth when a subsequent data packet is transmitted to the data receive end next time.

In another embodiment of the present disclosure, the apparatus further includes: a sending module, configured to send a packet loss probe message to the data receive end when it is detected that duration during which no data packet is transmitted reaches preset duration and a data packet for which no response message is returned exists in transmitted data packets, where the packet loss probe message carries last byte information of the last transmitted data packet; a third determining module, configured to determine a lost data packet from the transmitted data packets according to a response message corresponding to the packet loss probe message, when the response message is received, where the response message carries last byte information of the last data packet received by the data receive end and the last byte information of the last transmitted data packet; and a third transmission module, configured to retransmit the lost data packet.

In another embodiment of the present disclosure, the apparatus further includes: a fourth determining module, configured to determine first weighted packet loss information according to packet loss information of the interaction information and packet loss information of the historical interaction information of the transmission link; a fifth determining module, configured to determine, according to a prestored correspondence between weighted packet loss information and retransmission duration, first retransmission duration corresponding to the first weighted packet loss information; and a fourth transmission module, configured to retransmit the data packet when the first retransmission duration is reached.

In another embodiment of the present disclosure, the first transmission module 804 is configured to: determine a first weighted available bandwidth according to the available bandwidth and a parallel historical available bandwidth; and transmit the data packet to the data receive end based on a preset first data packet parallel transmission quantity, if the weighted available bandwidth is greater than a preset bandwidth threshold; or transmit the data packet to the data receive end based on a preset second data packet parallel transmission quantity, if the weighted available bandwidth is less than or equal to the preset bandwidth threshold, where the first data packet parallel transmission quantity is greater than the second data packet parallel transmission quantity.

In conclusion, the apparatus provided in this embodiment of the present disclosure determines an available bandwidth for current data transmission according to link status information of interaction information and link status information of historical interaction information of a transmission link, and further transmits a data packet to a data receive end according to the available bandwidth. Because data transmission is performed based on the TCP Protocol, neither a data receive end nor a data transmit end needs to support an additional protocol, and applicability is relatively strong. Moreover, when an available bandwidth is determined, both interaction information and historical interaction information of a transmission link are considered, so that the determined bandwidth can better reflect a current network status, thereby obviously improving a data transmission rate.

Figure 9:
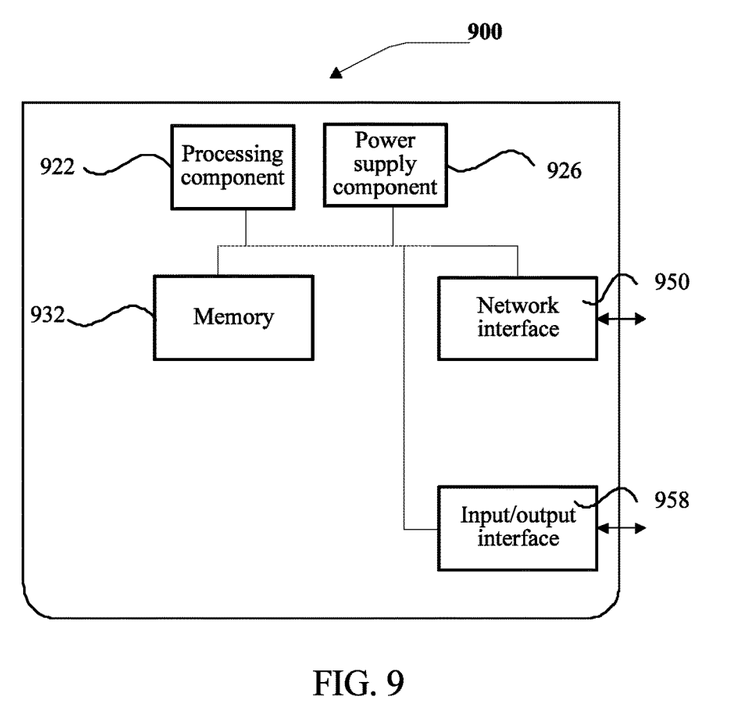
FIG. 9 is a schematic structural diagram of a data transmission apparatus according to another embodiment of the present disclosure.

FIG. 9 shows a data transmission apparatus according to an exemplary embodiment. Referring to FIG. 9, the apparatus may be a server 900. The server 900 includes a processing component 922, which further includes one or more processors, and a memory resource represented by a memory 932, which is configured to store an instruction that can be executed by the processing component 922, for example, an application program. The application program stored in the memory 932 may include one or more modules, where each module corresponds to a set of instructions. In addition, the processing component 922 is configured to execute the instruction, so as to perform the functions performed by the server in the foregoing data transmission method. The server 900 may further include: a power supply component 926, configured to perform power supply management on the server 900, a wired or wireless network interface 950, configured to connect the server 900 to a network, and an input/out (I/O) interface 958. The server 900 may operate an operating system stored in the memory 932, for example, Windows Server™, Mac OS X™, Unix™, Linux™, or FreeBSD™.

One or more processors are configured to perform the data transmission method in the foregoing embodiments by executing the foregoing program.

In an exemplary embodiment, a non-temporary computer readable storage medium including instructions is further provided, for example, a memory including instructions. The instructions may be executed by the processor of the server, to complete the data transmission method. For example, the non-temporary computer readable storage medium may be a read-only memory (ROM), a random-access memory (RAM), a compact disc read-only memory (CD-ROM), a magnetic tape, a floppy disk, an optical data storage device, or the like.

The server provided in this embodiment of the present disclosure determines an available bandwidth for current data transmission according to link status information of interaction information and link status information of historical interaction information of a transmission link, and further transmits a data packet to a data receive end according to the available bandwidth. Because data transmission is performed based on the TCP Protocol, neither a data receive end nor a data transmit end needs to support an additional protocol, and applicability is relatively strong. Moreover, when an available bandwidth is determined, both interaction information and historical interaction information of a transmission link are considered, so that the determined bandwidth can better reflect a current network status, thereby obviously improving a data transmission rate.

It should be noted that the foregoing function modules are merely described for exemplary purposes when the data transmission apparatus provided in the foregoing embodiments performs data transmission. In actual applications, the foregoing functions may be allocated to different function modules according to specific needs, which means that the internal structure of the data transmission apparatus is divided into different function modules, so as to complete all or some of the functions described above. In addition, the data transmission apparatuses provided in the foregoing embodiments is based on the same concept as the data transmission methods in the foregoing embodiments. For a specific implementation process, refer to the method embodiments. Details are not described herein again.

A person of ordinary skill in the art may understand that all or some of the steps of the foregoing embodiments may be implemented by using hardware, or may be implemented by using a program instructing relevant hardware. The program may be stored in a computer readable storage medium. The storage medium mentioned above may be a read-only memory, a magnetic disk, an optical disc, or the like.

The foregoing descriptions are merely preferred embodiments of the present disclosure, but are not intended to limit the present disclosure. Any modification, equivalent replacement, and improvement made within the spirit and principle of the present disclosure shall fall within the protection scope of the present disclosure.

What is claimed is:

1. A data transmission method, comprising:
    obtaining a present interaction information of a transmission link of a current moment;
    analyzing the present interaction information, to obtain a present link status information corresponding to the present interaction information;
    obtaining a historical interaction information of the transmission link of the current moment from a historical data warehouse;
    determining an available bandwidth for current data transmission according to the present link status information that corresponds to the present interaction information and a historical link status information that corresponds to the historical interaction information of the transmission link, comprising:
        analyzing the historical interaction information in a same manner as analyzing the present interaction information to obtain the historical link status information of the historical interaction information of the transmission link; and
    transmitting a data packet to a data receive end according to the available bandwidth.

2. The method according to claim 1, wherein the link status information comprises a round-trip time (RTT); and
    the determining an available bandwidth for current data transmission further comprises:
    determining, from an RTT of the present interaction information and an RTT of the historical interaction information, a target RTT satisfying a preset short-delay condition; and
    determining the available bandwidth for current data transmission according to the target RTT and a data transmission amount that corresponds to the target RTT.

3. The method according to claim 1, wherein the historical link status information comprises delay information, wherein the delay information comprises a round-trip time RTT and an RTT volatility rate; and
    the determining an available bandwidth for current data transmission further comprises:
    selecting a target RTT from an RTT of the present interaction information and an RTT of the historical interaction information according to an RTT volatility rate of the present interaction information and an RTT volatility rate of the historical interaction information; and
    determining the available bandwidth for current data transmission according to the target RTT and a data transmission amount that corresponds to the target RTT.

4. The method according to claim 3, wherein determining the available bandwidth further comprises:
- selecting a smallest RTT among the RTT of the present interaction information and one or more RTTs of the historical interaction information as the target RTT; and
- determining the available bandwidth as a multiplication result of the target RTT and the data transmission amount corresponding to the target RTT.

5. The method according to claim 1, wherein the transmitting a data packet to a data receive end according to the available bandwidth comprises:
- analyzing the present interaction information, to obtain packet loss information corresponding to the present interaction information;
- determining current network congestion status information according to the packet loss information that corresponds to the present interaction information and packet loss information that corresponds to the historical interaction information;
- adjusting the determined available bandwidth according to the current network congestion status information; and
- transmitting the data packet to the data receive end according to the adjusted available bandwidth.

6. The method according to claim 1, after the transmitting a data packet to a data receive end according to the available bandwidth, further comprising:
- analyzing the present interaction information, to obtain packet loss information corresponding to the present interaction information;
- determining current network congestion status information according to the packet loss information that corresponds to the present interaction information and packet loss information that corresponds to the historical interaction information;
- adjusting the available bandwidth according to the current network congestion status information; and
- performing transmission according to the adjusted available bandwidth when a subsequent data packet is transmitted to the data receive end next time.

7. The method according to claim 1, after the transmitting a data packet to a data receive end according to the available bandwidth, further comprising:
- sending a packet loss probe message to the data receive end when it is detected that a duration during which no data packet is transmitted reaches a preset duration and a data packet for which no response message is returned exists in transmitted data packets, wherein the packet loss probe message carries last byte information of a last transmitted data packet;
- determining a lost data packet from the transmitted data packets according to a response message corresponding to the packet loss probe message, when the response message is received, wherein the response message carries last byte information of a last data packet received by the data receive end and the last byte information of the last transmitted data packet; and
- retransmitting the lost data packet.

8. The method according to claim 1, after the transmitting a data packet to a data receive end according to the available bandwidth, further comprising:
- determining first weighted packet loss information according to packet loss information of the present interaction information and packet loss information of the historical interaction information of the transmission link;
- determining, according to a prestored correspondence between weighted packet loss information and retransmission duration, first retransmission duration corresponding to the first weighted packet loss information; and
- retransmitting the data packet when the first retransmission duration is reached.

9. The method according to claim 1, wherein the transmitting a data packet to a data receive end according to the available bandwidth comprises:
- determining a first weighted available bandwidth according to the available bandwidth and a parallel historical available bandwidth; and
- transmitting the data packet to the data receive end based on a preset first data packet parallel transmission quantity, if the weighted available bandwidth is greater than a preset bandwidth threshold; or transmitting the data packet to the data receive end based on a preset second data packet parallel transmission quantity, if the weighted available bandwidth is less than or equal to the preset bandwidth threshold, wherein the first data packet parallel transmission quantity is greater than the second data packet parallel transmission quantity.

10. A server, the server comprising:
one or more processors; and
a memory,
the memory storing one or more programs, the one or more programs being configured to be executed by the one or more processors, and the one or more programs comprising instructions used for performing the following operations:
obtaining a present interaction information of a transmission link of a current moment;
analyzing the present interaction information, to obtain a present link status information corresponding to the interaction information;
obtaining a historical interaction information of the transmission link of the current moment from a historical data warehouse;
determining an available bandwidth for current data transmission according to the present link status information that corresponds to the present interaction information and a historic link status information that corresponds to the historical interaction information of the transmission link, comprising:
- analyzing the historical interaction information in a same manner as analyzing the present interaction information to obtain the historical link status information of the historical interaction information of the transmission link; and
transmitting a data packet to a data receive end according to the available bandwidth.

11. The server according to claim 10, wherein the link status information comprises a round-trip time (RTT);
the determining an available bandwidth for current data transmission further comprises:
- determining, from an RTT of the present interaction information and an RTT of the historical interaction information, a target RTT satisfying a preset short-delay condition; and
- determining the available bandwidth for current data transmission according to the target RTT and a data transmission amount that corresponds to the target RTT.

12. The server according to claim 10, wherein the historic link status information comprises delay information, wherein the delay information comprises a round-trip time RTT and an RTT volatility rate; and the one or more programs further comprise instructions used for performing the following operations:

selecting a target RTT from an RTT of the present interaction information and an RTT of the historical interaction information according to an RTT volatility rate of the present interaction information and an RTT volatility rate of the historical interaction information; and determining the available bandwidth for current data transmission according to the target RTT and a data transmission amount that corresponds to the target RTT.

13. The server according to claim 12, wherein determining the available bandwidth further comprises:

selecting a smallest RTT among the RTT of the present interaction information and one or more RTTs of the historical interaction information as the target RTT; and determining the available bandwidth as a multiplication result of the target RTT and the data transmission amount corresponding to the target RTT.

14. The server according to claim 10, wherein the one or more programs further comprise instructions used for performing the following operations:

analyzing the present interaction information, to obtain packet loss information corresponding to the present interaction information;

determining current network congestion status information according to the packet loss information that corresponds to the present interaction information and packet loss information that corresponds to the historical interaction information;

adjusting the determined available bandwidth according to the current network congestion status information; and transmitting the data packet to the data receive end according to the adjusted available bandwidth.

15. The server according to claim 10, wherein the one or more programs further comprise instructions used for performing the following operations:

analyzing the present interaction information, to obtain packet loss information corresponding to the present interaction information;

determining current network congestion status information according to the packet loss information that corresponds to the present interaction information and packet loss information that corresponds to the historical interaction information;

adjusting the available bandwidth according to the current network congestion status information; and performing transmission according to the adjusted available bandwidth when a subsequent data packet is transmitted to the data receive end next time.

16. The server according to claim 10, wherein the one or more programs further comprise instructions used for performing the following operations:

sending a packet loss probe message to the data receive end when it is detected that duration during which no data packet is transmitted reaches a preset duration and a data packet for which no response message is returned exists in transmitted data packets, wherein the packet loss probe message carries last byte information of a last transmitted data packet;

determining a lost data packet from the transmitted data packets according to a response message corresponding to the packet loss probe message, when the response message is received, wherein the response message carries last byte information of a last data packet received by the data receive end and the last byte information of the last transmitted data packet; and retransmitting the lost data packet.

17. The server according to claim 10, wherein the one or more programs further comprise instructions used for performing the following operations:

determining first weighted packet loss information according to packet loss information of the present interaction information and packet loss information of the historical interaction information of the transmission link;

determining, according to a prestored correspondence between weighted packet loss information and retransmission duration, first retransmission duration corresponding to the first weighted packet loss information; and retransmitting the data packet when the first retransmission duration is reached.

18. The server according to claim 10, wherein the one or more programs further comprise instructions used for performing the following operations:

determining a first weighted available bandwidth according to the available bandwidth and a parallel historical available bandwidth; and transmitting the data packet to the data receive end based on a preset first data packet parallel transmission quantity, if the weighted available bandwidth is greater than a preset bandwidth threshold; or transmitting the data packet to the data receive end based on a preset second data packet parallel transmission quantity, if the weighted available bandwidth is less than or equal to the preset bandwidth threshold, wherein the first data packet parallel transmission quantity is greater than the second data packet parallel transmission quantity.

* * * * *